United States Patent
Tien et al.

(10) Patent No.: US 11,895,555 B2
(45) Date of Patent: Feb. 6, 2024

(54) DEVICE AND METHOD OF TRACKING AN EVENT

(71) Applicant: Kai-Wen Tien, Tainan (TW)

(72) Inventors: Kai-Wen Tien, Tainan (TW); Yen-Ting Lin, Taipei (TW)

(73) Assignee: Kai-Wen Tien, Tainan (TW)

( * ) Notice: Subject to any disclaimer, the term of this patent is extended or adjusted under 35 U.S.C. 154(b) by 206 days.

(21) Appl. No.: 17/336,328

(22) Filed: Jun. 2, 2021

(65) Prior Publication Data

US 2022/0369063 A1 Nov. 17, 2022

(30) Foreign Application Priority Data

May 12, 2021 (TW) .................................. 110117094

(51) Int. Cl.
*H04W 4/029* (2018.01)
*H04W 4/02* (2018.01)
*G08B 21/24* (2006.01)
*H04W 4/024* (2018.01)

(52) U.S. Cl.
CPC ............ *H04W 4/023* (2013.01); *G08B 21/24* (2013.01); *H04W 4/024* (2018.02); *H04W 4/029* (2018.02)

(58) Field of Classification Search
CPC ...... H04L 67/52; H04W 4/023; H04W 4/025; G08B 21/24
USPC ..................................................... 455/456.3
See application file for complete search history.

(56) References Cited

U.S. PATENT DOCUMENTS

| | | | | |
|---|---|---|---|---|
| 2002/0086680 A1* | 7/2002 | Hunzinger | ............... | H04W 4/02 455/456.1 |
| 2004/0192311 A1* | 9/2004 | Koskinen | ................ | H04W 4/02 455/457 |
| 2008/0261526 A1* | 10/2008 | Suresh | .................... | H04L 67/55 455/414.2 |
| 2010/0093371 A1* | 4/2010 | Gehrke | ................... | H04W 4/02 455/456.2 |
| 2014/0218202 A1* | 8/2014 | Wilson | ................... | A61B 5/002 340/686.6 |
| 2015/0079991 A1* | 3/2015 | Koskinen | ........ | H04W 36/00837 455/436 |
| 2015/0237475 A1* | 8/2015 | Henson | ................. | H04W 4/021 455/456.3 |
| 2021/0274032 A1* | 9/2021 | Rule | ..................... | H04W 12/61 |

FOREIGN PATENT DOCUMENTS

CN 109767646 B 2/2021
TW 201110739 A1 3/2011

* cited by examiner

*Primary Examiner* — Qutbuddin Ghulamali
(74) *Attorney, Agent, or Firm* — Winston Hsu

(57) ABSTRACT

A mobile equipment (ME) for tracking an event comprises at least one storage device; and at least one processing circuit, coupled to the at least one storage device. The at least one storage device stores instructions, and the at least one processing circuit is configured to execute the instructions of: activating a digital tag of the event in the ME, to track the event; and generating an indication on the ME according to the digital tag, when a distance between a first position of the ME and a second position at which the event occurs is greater than a threshold.

20 Claims, 7 Drawing Sheets

DEVICE AND METHOD OF TRACKING AN EVENT

BACKGROUND OF THE INVENTION

1. Field of the Invention

The present invention relates to a device and a method, and more particularly, to a device and a method of tracking an event.

2. Description of the Prior Art

With the development of technology, people often use mobile equipments (ME) (e.g., smart watches, phones, etc.) to meet various applications and needs in life. However, in the case of frequent movement, it is easy for people to lose their belongings (e.g., keys, wallets, certificates, etc.), or forget to do something at a certain location. Thus, how to effectively track objects or events via the ME is an important problem to be solved.

SUMMARY OF THE INVENTION

The present invention therefore provides a method and a mobile equipment (ME) for tracking an event to solve the abovementioned problem.

A mobile equipment (ME) for tracking an event comprises at least one storage device; and at least one processing circuit, coupled to the at least one storage device. The at least one storage device stores instructions, and the at least one processing circuit is configured to execute the instructions of: activating a digital tag of the event in the ME, to track the event; and generating an indication on the ME according to the digital tag, when a distance between a first position of the ME and a second position at which the event occurs is greater than a threshold.

A method of tracking an event comprises activating a digital tag of the event in a mobile equipment (ME), to track the event; and generating an indication on the ME according to the digital tag, when a distance between a first location of the ME and a second location where the event occurs is greater than a threshold value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
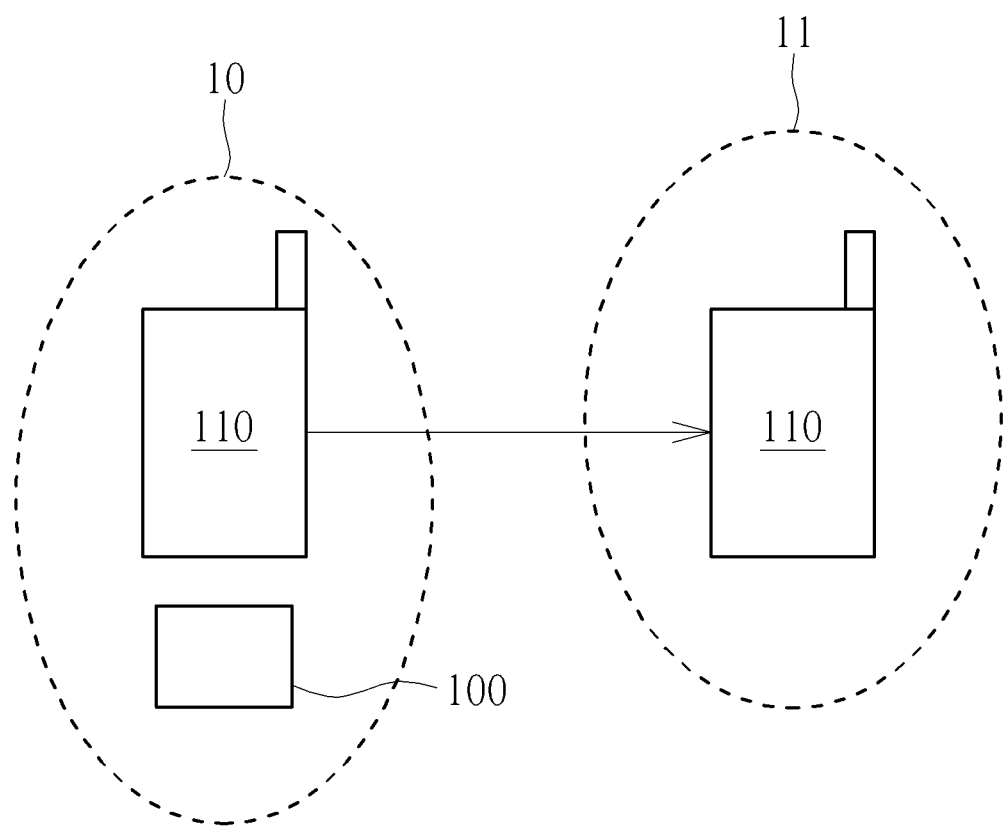
FIG. 1 is a schematic diagram of a scenario of tracking an object according to an example of the present invention.

FIG. 1 is a schematic diagram of a scenario of tracking an object according to an example of the present invention. In one example, an object 100 and a mobile equipment (ME) 110 are near (e.g., at) a location 10. Then, the ME 110 is moved to a location 11. Thus, a distance between the object 100 and the ME 110 is increased. For example, the object 100 is at the location 10, and a user of the ME 110 uses the ME 110 at the location 10. However, the user only takes the ME 110 to the location 11 without taking the object 100, when the user moves to the location 11. In this situation, the user may lose the object 100.

In another example, an event occurs near (e.g., at) the location 10. Then, the ME 110 is moved to the location 11. Thus, a distance between the location where the event occurs and the location of the ME 110 is increased. For example, the event occurs at the location 10, and the user of the ME 110 uses the ME 110 at the location 10. However, the user only takes the ME 110 to the location 11 and the ME 110 does not perform an operation related to the event or the user does not perform an action related to the event, when the user moves to the location 11. In this situation, inconvenience is caused to the user.

Figure 2:
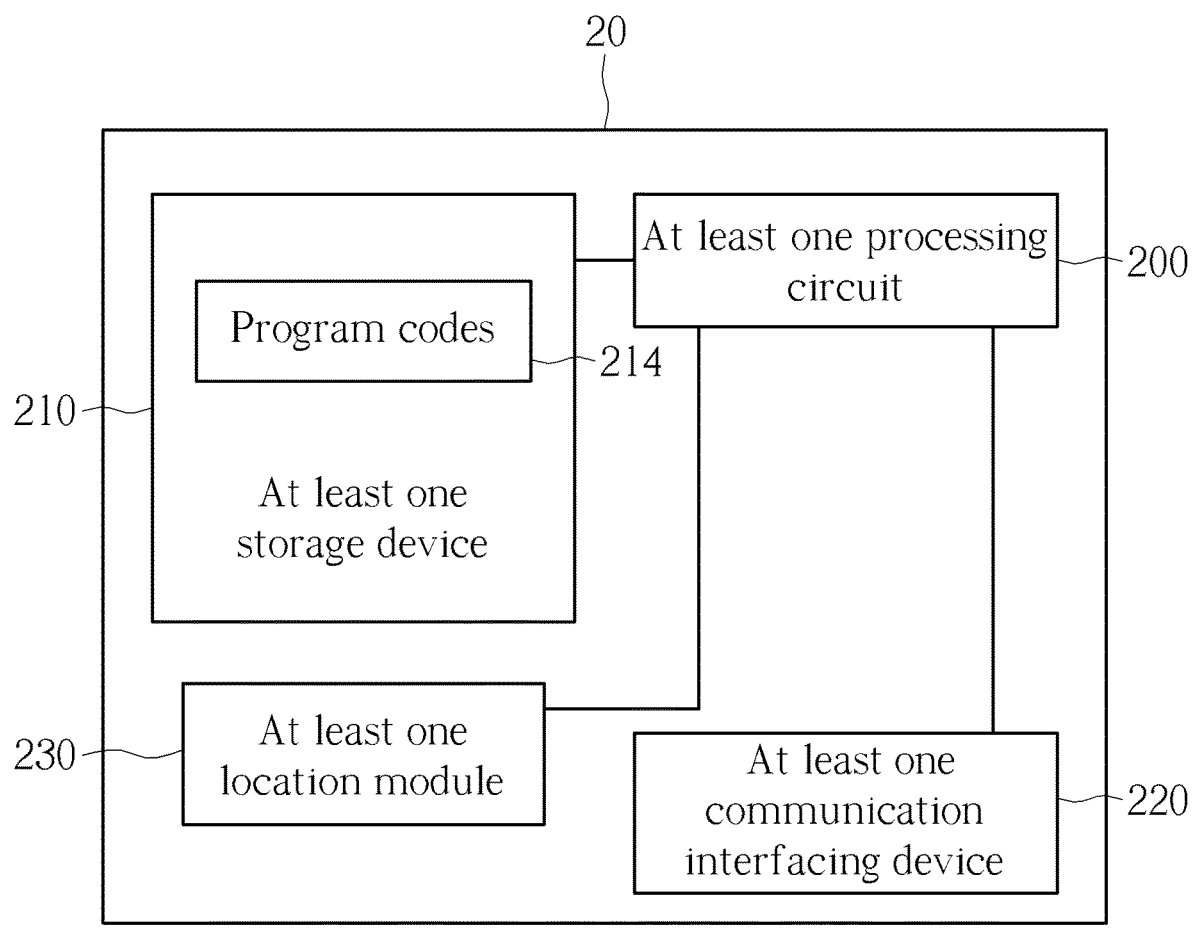
FIG. 2 is a schematic diagram of a mobile equipment according to an example of the present invention.

FIG. 2 is a schematic diagram of a ME 20 according to an example of the present invention. The ME 20 may include at least one processing circuit 200, at least one storage device 210, at least one communication interfacing device 220 and at least one location module 230. The at least one processing circuit 200 may include a microprocessor or Application Specific Integrated Circuit (ASIC). The at least one storage device 210 may be any data storage device that may store program codes 214, and the at least one processing circuit 200 may access and execute the program codes 214 via the at least one storage device 210. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 may include at least one transceiver, and transmits and receives signals (e.g., data, messages and/or packets) according to processing results of the at least one processing circuit 200. The at least one location module 230 locates the ME 20 (e.g., identify a location of the ME 20), and may include a sensor. In addition, the ME 20 may further include a wireless communication module and/or other electronic module(s), but it is not limited thereto.

Figure 3:
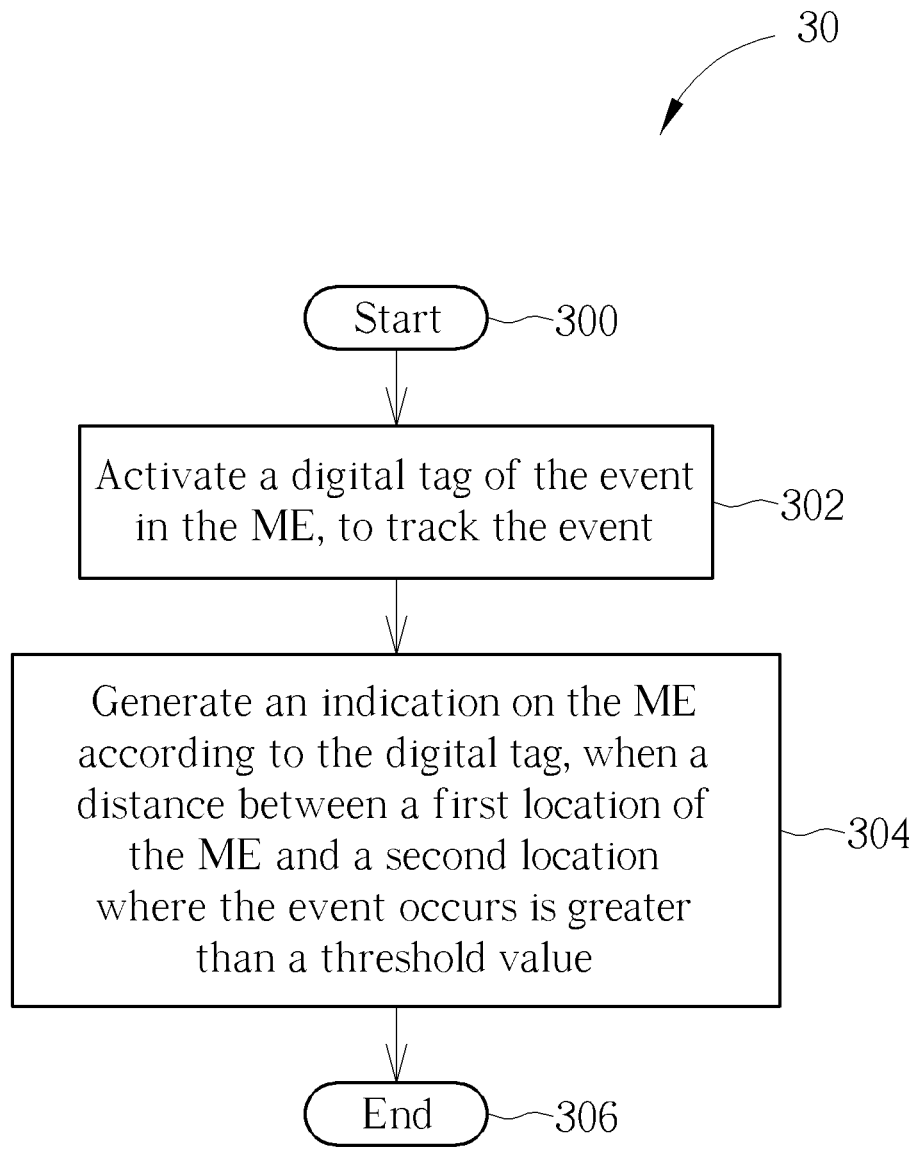
FIG. 3 is a flowchart of a process according to an example of the present invention.

FIG. 3 is a flowchart of a process 30 according to an example of the present invention. The process 30 may be utilized in a ME, to track an event. The process 30 may be compiled into the program codes 214 and includes the following steps:

Step 300: Start.

Step 302: Activate a digital tag of the event in the ME, to track the event.

Step 304: Generate an indication on the ME according to the digital tag, when a distance between a first location of the ME and a second location where the event occurs is greater than a threshold value.

Step 306: End.

According to the process 30, the ME activates a digital tag of (for) an event in the ME to track the event. The ME generates an indication on the ME according to the digital tag, when a distance between a first location of the ME and a second location where the event occurs is greater than a threshold value. For example, the event comprises an object located (e.g., left) at the second location. The ME generates the indication to remind the user, when the ME is far from the object. The object may be a daily necessities such as a key, credit card, book, piece of clothing, umbrella, tablet, and is not limited thereto. The ME may be an electronic device such as a smart watch, mobile phone, smart glasses, smart bracelet, and is not limited thereto.

In one example, the event comprises an operation (e.g., mobile payment) performed on the ME at the second location. After the ME performs the operation, the ME is taken to the first location and a distance between the locations is greater than the threshold value. At this time, the ME generates the indication, for example, to remind the user to take a physical invoice. In one example, the event comprises an object located at the second location. The ME generates the indication, when the ME is taken to the first location and a distance between the locations is greater than the threshold value. In one example, the object may notify that the event occurs to the ME via near field communication (NFC), to trigger the ME to generate the indication. In one example, the user may (simultaneously) set multiple digital tags to track multiple objects, e.g., in a certain area. In one example, the user may share the digital tag with other people (e.g., family or friends), to use the digital tag together. Thus, the problem of tracking the event is solved.

Realization of the process 30 is not limited to the above description. The following examples may be applied for realizing the process 30.

In one example, the ME (automatically) activates the digital tag according to information (pre)set by a user of the ME. In one example, the ME (passively) activates the digital tag according to a (manual) selection of a user of the ME. In one example, the ME activates the digital tag of the object in the ME at a location near (e.g., which is) the second location.

In one example, the ME determines whether the ME is in an area, when activating the digital tag. The ME generates the indication on the ME when the distance is greater than the threshold value, if the ME is in the area, wherein the threshold value is corresponding to the area. For example, the area is where the user often stays, such as office or home, but is not limited thereto. In one example, the ME determines whether the ME is in an area according to the digital tag and/or an application (e.g., global positioning system (GPS)) of a location module.

Figure 4:
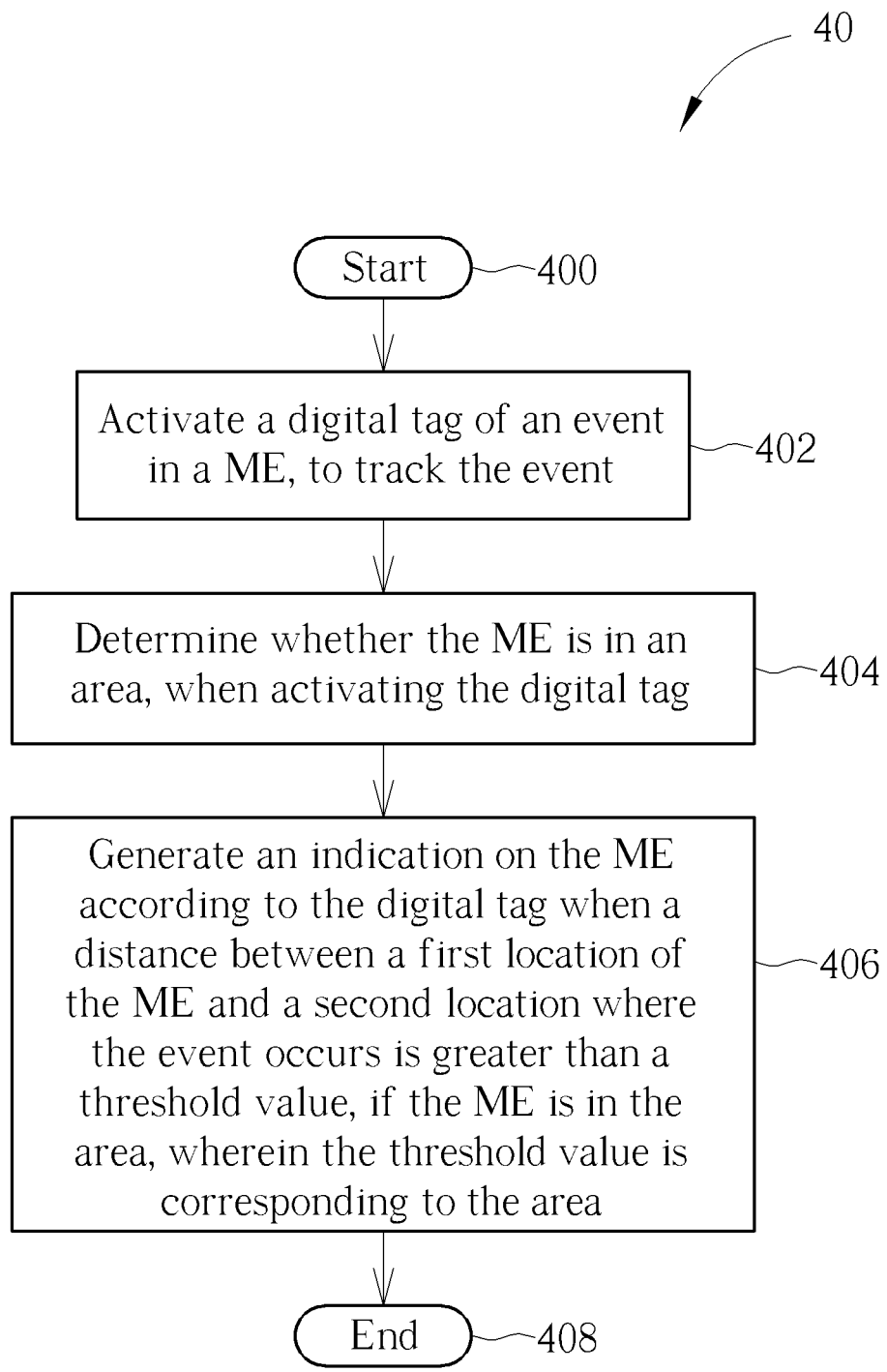
FIG. 4 is a flowchart of a process according to an example of the present invention.

The above examples of the ME can be summarized into a process 40 in FIG. 4, which may be compiled into the program codes 214 and includes the following steps:

Step 400: Start.

Step 402: Activate a digital tag of an event in a ME, to track the event.

Step 404: Determine whether the ME is in an area, when activating the digital tag.

Step 406: Generate an indication on the ME according to the digital tag when a distance between a first location of the ME and a second location where the event occurs is greater than a threshold value, if the ME is in the area, wherein the threshold value is corresponding to the area.

Step 408: End.

Detail operations and variations of the process 40 can be referred to the above description, and is not limited thereto.

In one example, the ME determines whether a user of the ME indicates (e.g., needs) tracking the event. The ME activates the digital tag, if the user indicates tracking the event. For example, the user may activate a corresponding option in the ME, to indicate tracking the event. In one example, the ME generates a request message for tracking the event in the ME, and the ME determines whether the user indicates tracking the event according to a user response from the user for the request message. In one example, the ME determines that the ME is in an area, and the ME determines whether the user indicates tracking the event in the area according to a scenario corresponding to the area. For example, the area is an area where the user easily loses object(s), such as a cafe shop, restaurant, station, MRT station, etc., but is not limited thereto. In one example, the scenario is preset by a software in the ME, or is set by a user of the ME in the ME.

Figure 5:
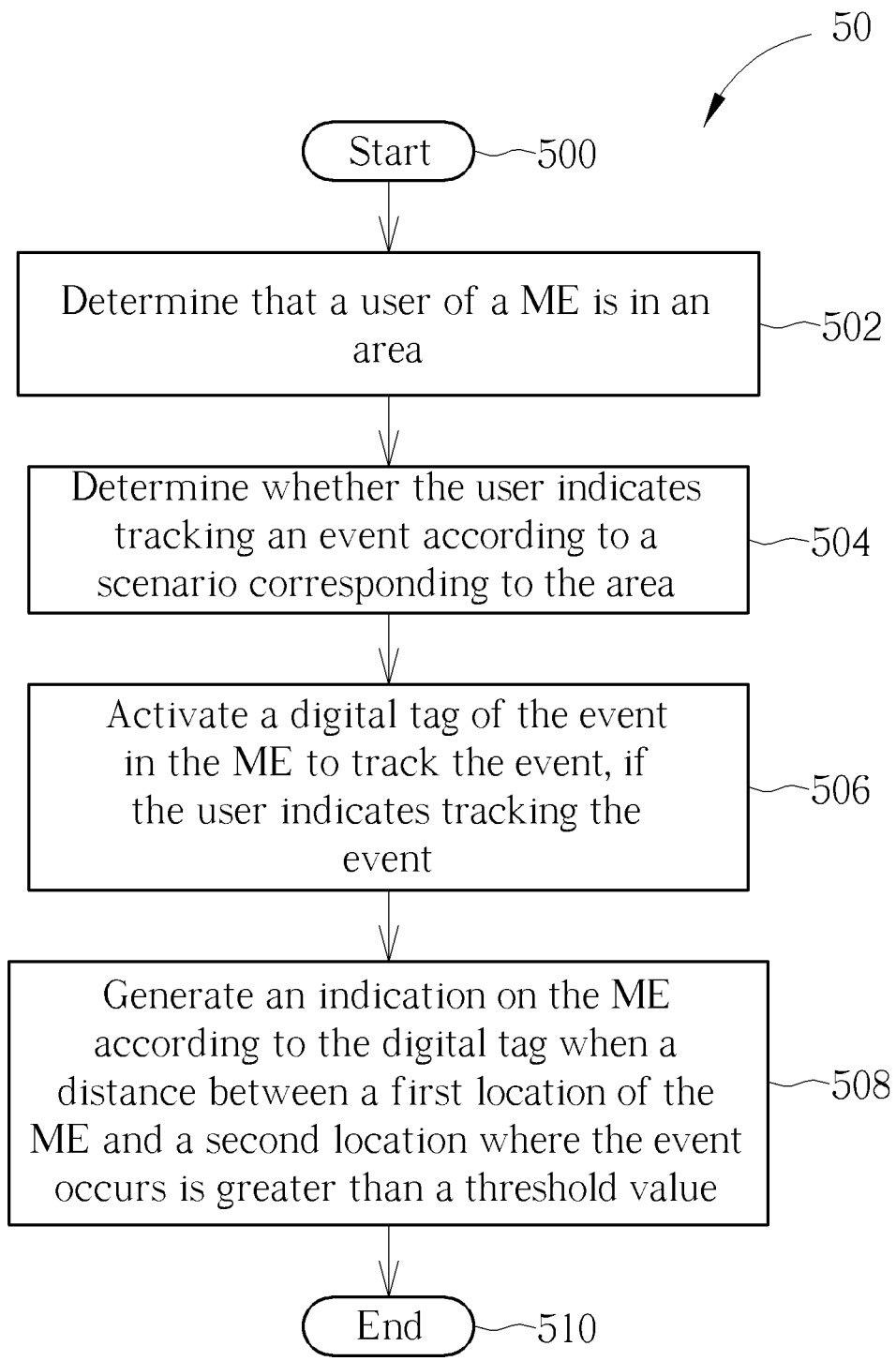
FIG. 5 is a flowchart of a process according to an example of the present invention.

The above examples of the ME can be summarized into a process 50 in FIG. 5, which may be compiled into the program codes 214 and includes the following steps:

Step 500: Start.

Step 502: Determine that a user of a ME is in an area.

Step 504: Determine whether the user indicates tracking an event according to a scenario corresponding to the area.

Step 506: Activate a digital tag of the event in the ME to track the event, if the user indicates tracking the event.

Step 508: Generate an indication on the ME according to the digital tag when a distance between a first location of the ME and a second location where the event occurs is greater than a threshold value.

Step 510: End.

Detail operations and variations of the process 50 can be referred to the above description, and is not limited thereto.

Figures 6, 7:
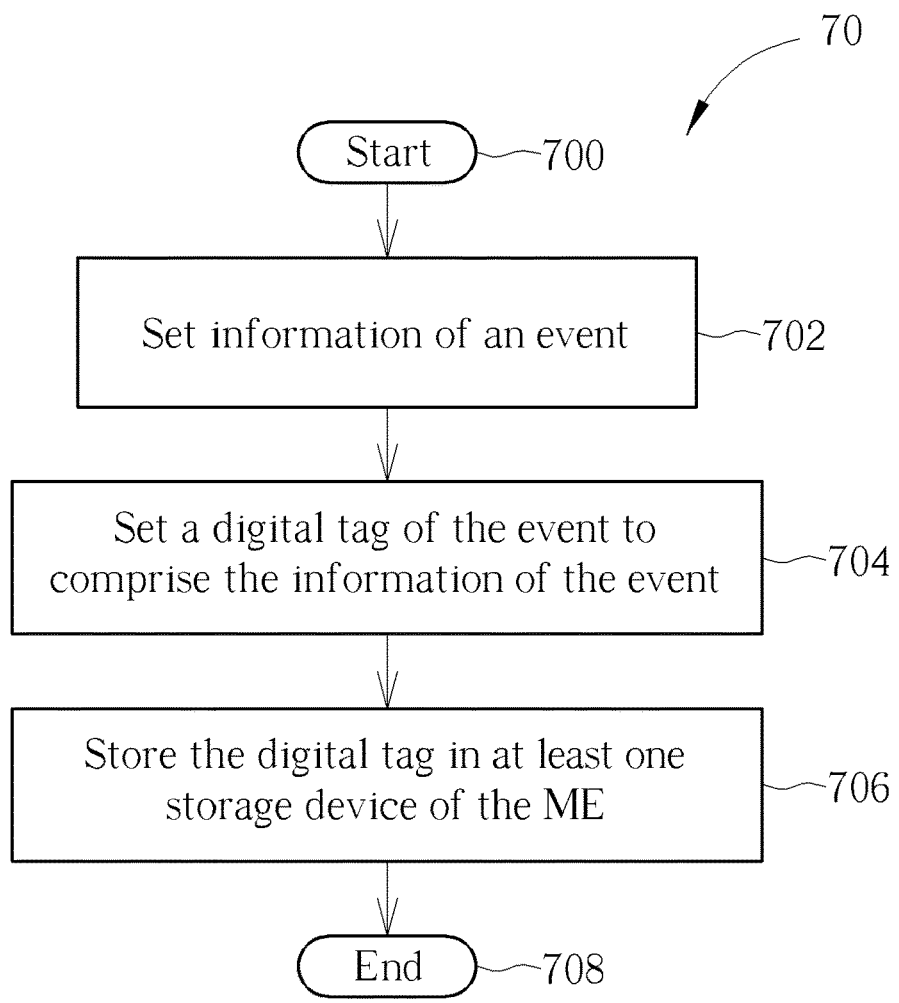
FIG. 6 is a schematic diagram of a digital tag table according to an example of the present invention.
FIG. 7 is a flowchart of establishing a digital tag according to an example of the present invention.

FIG. 6 is a schematic diagram of a digital tag table 60 according to an example of the present invention. The digital tag table 60 includes digital tag 1, digital tag 2, . . . , with corresponding event 1, event 2 . . . , and corresponding information 1, information 2, . . . . In one example, a digital tag includes (or indicates) information (e.g., fields, options, etc.) of (corresponding to) the event (or object). For example, the information may be digital information such as pictures, texts, but is not limited thereto. In one example, the digital tag may further include (or indicate) initial information (e.g., geographic location) of the ME and/or other information related to the ME, but is not limited thereto. In one example, the digital tag is preset (e.g., built in) by a software in the ME, or is set (e.g., input, customized) by a user of the ME in the ME. In one example, the digital tag is set (e.g., stored) in a storage device (e.g., the storage device 210) of the ME. In one example, the ME sets the information of (corresponding to) the event (or object), sets the digital tag of the event to comprise the information of the event, and stores the digital tag in at least one storage device of the ME. In one example, the information is preset by a software in the ME, or is set by a user of the ME in the ME. For example, the information for the event (e.g., book) can be an option of the book built in the ME, or an item "book" entered by the user.

The above examples of the ME can be summarized into a process 70 in FIG. 7, which may be compiled into the program codes 214 and includes the following steps:

Step 700: Start.
Step 702: Set information of an event.
Step 704: Set a digital tag of the event to comprise the information of the event.
Step 706: Store the digital tag in at least one storage device of the ME.
Step 708: End.

Detail operations and variations of the process 70 can be referred to the above description, and is not limited thereto.

In one example, the ME determines (e.g., calculates) whether the distance is greater than the threshold value, if it is detected that the ME is moved (e.g., by a user of the ME) from the first location to the second location. In one example, the distance between the first location and the second location is determined according to the digital tag and an application (e.g., accelerometer, gyroscope, Bluetooth, etc.) of a location module.

In one example, the threshold value is preset by a software in the ME, or is set by a user of the ME in the ME. In one example, the threshold value is determined according to at least one of an area or a scenario where the ME is located. That is, different areas and different scenarios may be corresponding to respective threshold values.

In one example, the indication is a message on a monitor (screen) of the ME, or is a sound made by the ME. That is, the indication may be used for reminding (e.g., warning) that the user forgets the object carried. In one example, the indication includes the message and the sound.

Figure 8:
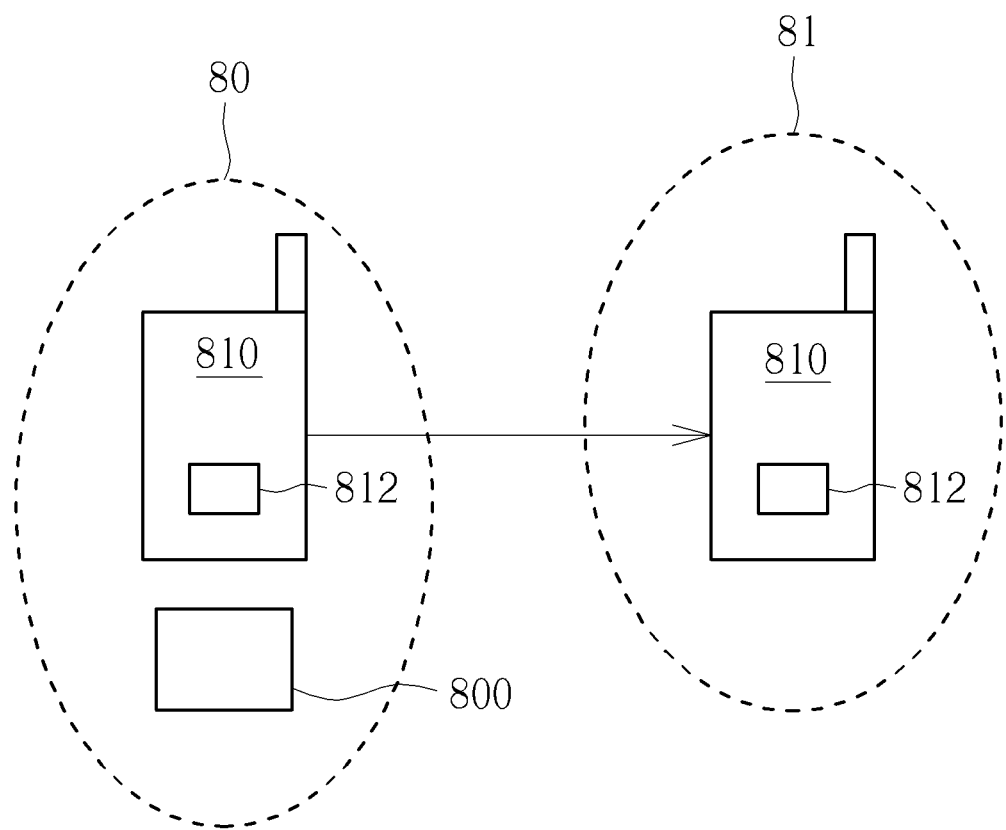
FIG. 8 is a schematic diagram of tracking an object according to an example of the present invention.

FIG. 8 is a schematic diagram of tracking an object according to an example of the present invention. In FIG. 8, an object 800 (e.g., book) is at a location 80, and a ME 810 (e.g., smart phone) includes a digital tag 812. According to the present invention, the ME 810 activates the digital tag 812 (e.g., option "book" in the ME 810) for the object 800, to track the object 800. Then, the ME 810 is moved from the location 80 to a location 81. The ME 810 generates an indication (e.g., sound) on the ME 810 according to the digital tag 812, when a distance between a location of the ME 810 and a location of the object 800 (i.e., the distance between the ME 810 after being moved and the object 800) is greater than a threshold value (e.g., 5 m). As a result, a user of the ME 810 knows that he forgot the object 800 he carried according to the indication.

The operation of "determine" described above may be replaced by the operation of "compute", "calculate", "obtain", "generate", "output", "use", "choose/select" or "decide". The term of "according to" described above may be replaced by "in response to". The phrase of "associated with" described above may be replaced by "of" or "corresponding to". The phrase of "indicated in" described above may be replaced by "indicated by". The term of "via" described above may be replaced by "on", "in" or "at". The term of "in" described above may be replaced by "within". The phrase of "at least A or B" described above may be replaced by "at least one of A or at least one of B" or "At least one selected from the group of A and B". The term of "if" described above may be replaced by "when" or "after". The term of "greater" described above may be replaced by "not smaller", and the term of "smaller" described above may be replaced by "not greater".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the ME 110.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the ME 110.

To sum up, the present invention provides a device and a method, to effectively (e.g., with a low power consumption) track an event. The ME can effectively tracks the event via a digital tag. Thus, problems of tracking the event can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile equipment (ME) for tracking an event, comprising:
   at least one storage device; and
   at least one processing circuit, coupled to the at least one storage device, wherein the at least one storage device stores instructions, and the at least one processing circuit is configured to execute the instructions of:
   generating and storing a digital tag of the event in the at least one storage device by generating and storing digital information in the at least one storage device;
   activating the digital tag, to track the event, wherein the digital tag comprises information of an area; and
   generating an indication on the ME according to the digital tag, when a distance between a first location of the ME and a second location where the event occurs is greater than a threshold value, wherein the threshold is determined according to the area.

2. The ME of claim 1, wherein the instructions further comprise:
   determining whether the ME is in the area, when activating the digital tag;
   generating the indication on the ME when the distance is greater than the threshold value, if the ME is in the area.

3. The ME of claim 1, wherein the instructions further comprise:
   determining whether a user of the ME indicates tracking the event; and
   activating the digital tag, if the user indicates tracking the event.

4. The ME of claim 3, wherein the instructions further comprise:
   generating a request message for tracing the event in the ME; and
   determining whether the user indicates the event according to a user response from the user for the request message.

5. The ME of claim 3, wherein the instructions further comprise:
   determining that the ME is in the area; and
   determining whether the user indicates tracking the event in the area according to the area.

6. The ME of claim 1, wherein a scenario is preset by a software in the ME, or is set by a user of the ME in the ME.

7. The ME of claim 1, wherein the digital tag comprises information of the event.

8. The ME of claim 1, wherein the digital tag is preset by a software in the ME, or is set by a user of the ME in the ME.

9. The ME of claim 1, further comprising at least one location module including at least one sensor, wherein the distance between the first location and the second location is determined by the location module.

10. The ME of claim 1, wherein the indication is a message on a monitor of the ME, or is a sound made by the ME.

11. The ME of claim 1, wherein the event comprises an object at the second location.

12. The ME of claim 1, wherein the event comprises an operation performed by the ME at the second location.

13. A method of tracking an event for a mobile equipment (ME), comprising:
   generating and storing a digital tag of the event in at least one storage device of the ME by generating and storing digital information in the at least one storage device;
   activating the digital tag, to track the event, wherein the digital tag comprises information of an area; and
   generating an indication on the ME according to the digital tag, when a distance between a first location of the ME and a second location where the event occurs is greater than a threshold value, wherein the threshold is determined according to the area.

14. The method of claim 13, further comprising:
   determining whether the ME is in the area, when activating the digital tag;
   generating the indication on the ME when the distance is greater than the threshold value, if the ME is in the area.

15. The method of claim 13, further comprising:
   determining whether a user of the ME indicates tracking the event; and
   activating the digital tag, if the user indicates tracking the event.

16. The method of claim 15, further comprising:
   generating a request message for tracing the event in the ME; and
   determining whether the user indicates the event according to a user response from the user for the request message.

17. The method of claim 15, further comprising:
   determining that the ME is in the area; and
   determining whether the user indicates tracking the event in the area according to the area.

18. The method of claim 13, wherein the digital tag comprises information of the event.

19. The method of claim 13, wherein the event comprises an object at the second location.

20. The method of claim 13, wherein the event comprises an operation performed by the ME at the second location.

\* \* \* \* \*